US005965506A

United States Patent [19]

Bacher et al.

[11] Patent Number: 5,965,506

[45] Date of Patent: Oct. 12, 1999

[54] FABRIC BLEACHING COMPOSITION

[75] Inventors: Jean-Pierre Bacher, Buschwiller; Claude Eckhardt, Riedisheim, both of France; Dieter Reinehr, Kandern, Germany

[73] Assignee: Ciba Specialty Chemicals Corporation, Tarrytown, N.Y.

[21] Appl. No.: 08/967,318

[22] Filed: Oct. 28, 1997

Related U.S. Application Data

[63] Continuation of application No. 08/503,751, Jul. 18, 1995, abandoned.

[30] Foreign Application Priority Data

| | | | |
|---|---|---|---|
| Jul. 21, 1994 | [GB] | United Kingdom | 9414690 |
| Dec. 15, 1994 | [GB] | United Kingdom | 9425322 |

[51] Int. Cl.[6] .............................. C11D 3/39; C11D 3/395; C01B 15/055

[52] U.S. Cl. ............... 510/311; 252/186.33; 252/186.38; 8/111

[58] Field of Search ......................... 252/186.33, 186.38; 8/111; 510/311; 502/167

[56] References Cited

U.S. PATENT DOCUMENTS

| | | | |
|---|---|---|---|
| 4,430,243 | 2/1984 | Bragg | 510/311 |
| 4,478,733 | 10/1984 | Oakes | 510/311 |
| 4,655,785 | 4/1987 | Reinert et al. | 8/442 |
| 4,728,455 | 3/1988 | Rerek | 510/303 |
| 5,114,606 | 5/1992 | van Vliet et al. | 8/111 |
| 5,114,611 | 5/1992 | Van Kralingen et al. | 252/186.33 |
| 5,194,416 | 3/1993 | Jureller et al. | 502/167 |
| 5,227,084 | 7/1993 | Martens et al. | 510/305 |
| 5,462,564 | 10/1995 | Eckhardt et al. | 8/111 |
| 5,474,576 | 12/1995 | Thoer et al. | 8/111 |
| 5,622,646 | 4/1997 | Scialla et al. | 252/186.33 |
| 5,653,910 | 8/1997 | Kerschner et al. | 252/186.33 |
| 5,686,014 | 11/1997 | Baillely et al. | 252/186.33 |

FOREIGN PATENT DOCUMENTS

| | | |
|---|---|---|
| 0458397 | 11/1991 | European Pat. Off. . |
| 0458398 | 11/1991 | European Pat. Off. . |
| 0544440 | 6/1993 | European Pat. Off. . |
| 0544490 | 6/1993 | European Pat. Off. . |
| 0544519 | 6/1993 | European Pat. Off. . |
| 0549272 | 6/1993 | European Pat. Off. . |
| 0549271 | 10/1993 | European Pat. Off. . |
| 91/14694 | 10/1991 | WIPO . |
| 93/03838 | 3/1993 | WIPO . |

OTHER PUBLICATIONS

J. Chem. Soc. Dalton Trans., 1994, pp. 1265–1269.

Chem. Abstr. vol. 01, No. 12, (1974), p. 607, 72056t.

*Primary Examiner*—Joseph D. Anthony
*Attorney, Agent, or Firm*—Kevin T. Mansfield

[57] ABSTRACT

A fabric bleaching composition comprising a peroxy compound and a specified manganese complex is disclosed, as well as a process for bleaching and/or cleaning a fabric by contacting it with said fabric bleaching composition.

34 Claims, No Drawings

FABRIC BLEACHING COMPOSITION

This application is a continuation of application Ser. No. 08/503,751, filed on Jul. 18, 1995 now abandoned.

The present invention relates to fabric bleaching compositions comprising a peroxygen compound and, as bleach activator, a manganese complex.

Bleaching compositions which contain a peroxide bleaching agent are well known. In such compositions, the bleaching agent functions to remove common domestic stains such as tea, coffee, fruit and wine stains from the soiled clothing at the boil. If the washing temperature is reduced to below 60° C., however, the efficacy of the bleaching agent is correspondingly reduced.

It is also well known that certain heavy metal ions, or complexes thereof, function to catalyse the decomposition of hydrogen peroxide, or of compounds which can liberate hydrogen peroxide, in order to render the peroxide compound effective at temperatures below 60° C.

For example, in U.S. Pat. No. 5,114,611, there is described the activation of a peroxy compound by a complex of a transition metal (Mn, Co, Fe or Cu) with a non-(macro) cyclic ligand, preferably 2,2-bispyridylamine or 2,2-bispyridylmethane.

Moreover, in U.S. Pat. No. 5,114,606, there is described a manganese complex, for use as a bleach catalyst for a peroxy compound, which is a water-soluble complex of manganese II, III or IV, or mixtures thereof, with a ligand which is a non-carboxylate polyhydroxy compound, having at least three consecutive C—OH groups in its molecular structure, preferably sorbitol.

Other disclosures, relating to the use of metal complexes as activators for peroxy compounds in bleaches or detergents, include U.S. Pat. No. 5,227,084, U.S. Pat. No. 5,194,416, U.S. Pat. No. 4,728,455, U.S. Pat. No. 4,478,733, U.S. Pat. No. 4,430,243, EP-A-549 271, EP-A-549 272, EP-A-544 519, EP-A-544 490, EP-A-544 440, EP-A-509 787, EP-A-458 397 and EP-A-458 398.

It has now been found, surprisingly, that certain other manganese complexes are excellent bleach catalysts for peroxy compounds and, relative to known bleach catalysts, provide enhanced bleach effects at low wash temperatures (e.g. at 15 to 40° C.) and/or using shorter washing times.

Accordingly, the present invention provides a fabric bleaching composition comprising a) a peroxy compound; and b) 0.0005 to 0.5, preferably 0.005 to 0.05%, by weight of manganese, of one or more water-soluble manganese complexes having one of the formulae (1), (2), (3), (4), (5), (6), (7) (8), (9), (10), (11), (12), (13), (14), (15), (16), (17) or (18):

(1)

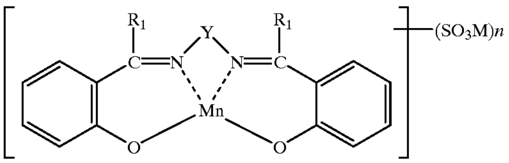

(2)

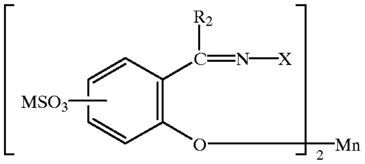

(3)

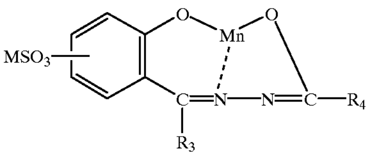

(4)

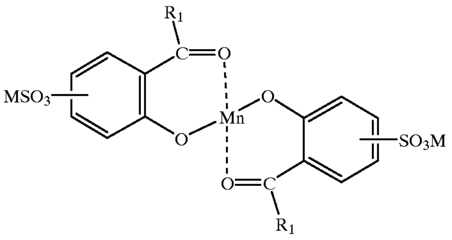

-continued
(5)
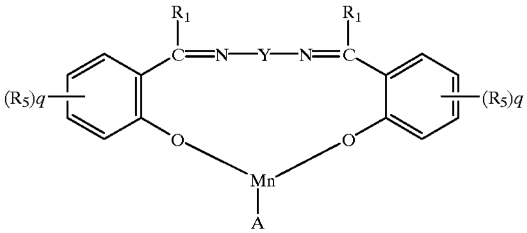
(6)
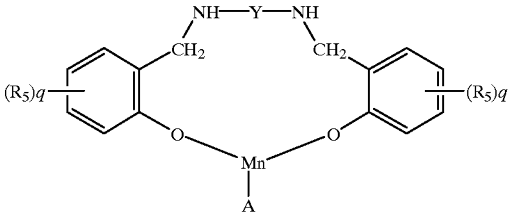
(7)
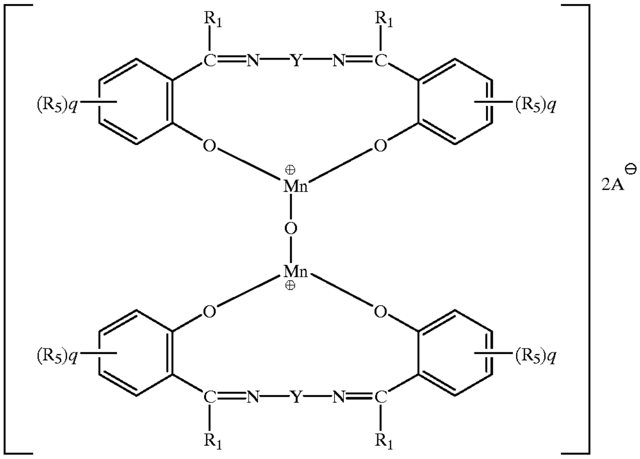
(8)
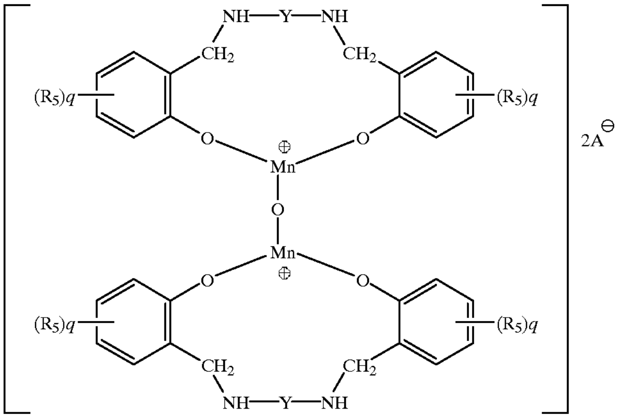
(9)
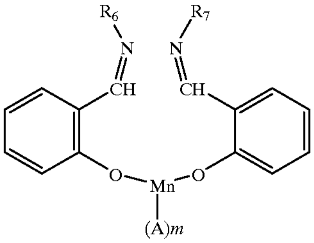

-continued
(10)
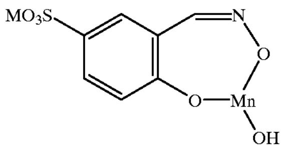
(11)
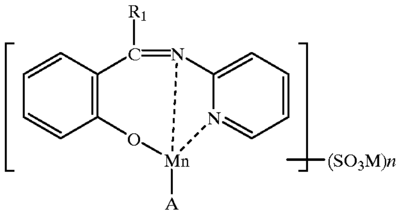
(12)
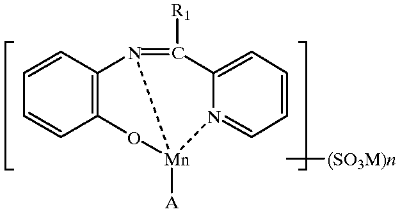
(13)
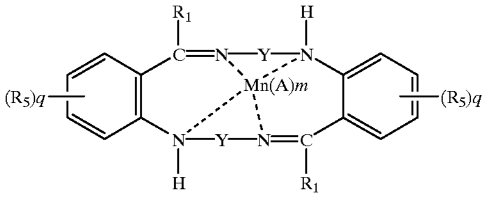
(14)
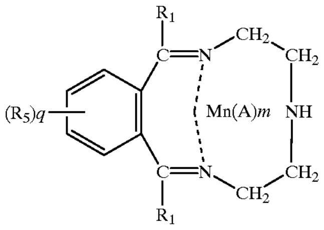
(15)
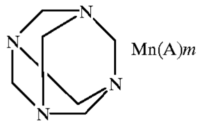
(16)
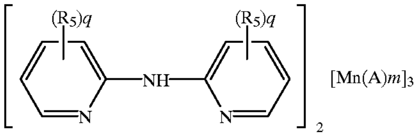

-continued (17)

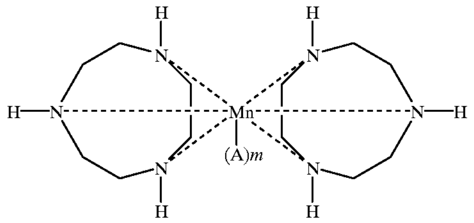

or (18)

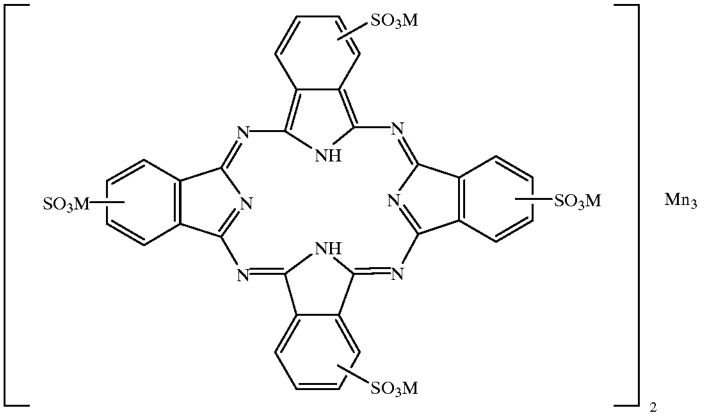

in which $R_1$, $R_2$, $R_3$ and $R_4$ are the same or different and each is hydrogen or optionally substituted alkyl, cycloalkyl or aryl; $R_5$ is hydrogen, optionally substituted alkyl, optionally substituted alkoxy, halogen, cyano, N(optionally substituted alkyl)$_2$, N⊕(optionally substituted alkyl)$_3$ or a water-solubilising group, especially $SO_3M$; $R_6$ and $R_7$ are the same or different and each is NH—CO—$NH_2$, a group of formula

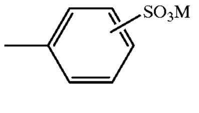

or a group of formula

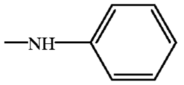

;

Y is optionally substituted alkylene or cyclohexylene; X is OH, $NH_2$, optionally substituted alkyl or optionally substituted aryl; n is 0, 1, 2 or 3; M is hydrogen, an alkali metal atom, ammonium or a cation formed from an amine; m is 2 or 3; q is 0, 1, 2 or 3; and A is an anion.

When one or more of $R_1$, $R_2$, $R_3$, $R_4$, $R_5$ and X are optionally substituted alkyl, preferred alkyl groups are $C_1$–$C_{12}$-, especially $C_1$–$C_4$-alkyl groups. The alkyl groups may be branched or unbranched and may be optionally substituted, e.g. by halogen such as fluorine, chlorine or bromine, by $C_1$–$C_4$-alkoxy such as methoxy or ethoxy, by phenyl or carboxyl, by $C_1$–$C_4$-alkoxycarbonyl such as acetyl, or by a mono- or di-$C_1$–$C_4$alkylated amino group.

Optionally substituted alkoxy groups $R_5$ are preferably $C_1$–$C_8$-, especially $C_1$–$C_4$-alkoxy groups. The alkoxy groups may be branched or unbranched and may be optionally substituted, e.g. by halogen such as fluorine, chlorine or bromine, by $C_1$–$C_4$-alkoxy such as methoxy or ethoxy, by phenyl or carboxyl, by $C_1$–$C_4$-alkoxycarbonyl such as acetyl, or by a mono- or di-alkylated amino group.

Halogen atoms $R_5$ are preferably bromo or, especially, chloro atoms.

N(optionally substituted alkyl)$_2$ groups $R_5$ are preferably N(optionally substituted $C_1$–$C_4$alkyl)$_2$ groups, especially N(methyl)$_2$ or N(ethyl)$_2$.

N⊕(optionally substituted alkyl)$_3$ groups $R_5$ are N⊕(optionally substituted $C_1$–$C_4$alkyl)$_3$, especially N⊕(methyl)$_3$ or N⊕(ethyl)$_3$.

When one or more of $R_1$, $R_2$, $R_3$ and $R_4$ are cycloalkyl, this may also be substituted, e.g. by $C_1$–$C_4$-alkyl or $C_1$–$C_4$-alkoxy.

When one or more of $R_1$, $R_2$, $R_3$, $R_4$ and X are optionally substituted aryl, they are preferably a phenyl or naphthyl group which may be substituted by $C_1$–$C_4$-alkyl, e.g. by methyl, ethyl, propyl, isopropyl, butyl, isobutyl, sec.-butyl or tert.-butyl, by $C_1$–$C_4$-alkoxy such as methoxy, ethoxy, propoxy, isopropoxy, butoxy, isobutoxy, sec.-butoxy or tert.-butoxy, by halogen such as fluorine, chlorine or bromine, by $C_2$–$C_5$-alkanoylamino, such as acetylamino, propionylamino or butyrylamino, by nitro, sulpho or by dialkylated amino.

When Y is alkylene, it is preferably a $C_2$–$C_4$-alkylene residue, especially a —$CH_2$–$CH_2$- bridge. Y may also be a $C_2$–$C_8$-alkylene residue which is interrupted by oxygen or, especially, by nitrogen, in particular the —$(CH_2)_3$–NH—$(CH_2)_3$-, —$(CH_2)_2$–NH—$(CH_2)_2$ or —$(CH_2)_2$–N($CH_3$)—$(CH_2)_2$- bridge.

Anions A include halide, especially chloride, chlorate, sulphate, nitrate, hydroxy, methoxy, $BF_4$, $PF_6$, carboxylate, especially acetate, triflate or tosylate.

With respect to the compounds of formula (1), preferably each $R_1$ is hydrogen, Y is the ethylene bridge and n is 2, whereby one sulpho group is preferably present in each benzene ring, especially in para position to the oxygen atom.

In relation to the compounds of formula (2), preferably $R_2$ is hydrogen and X is OH.

With respect to the compounds of formula (3), preferred compounds are those in which $R_3$ is hydrogen and $R_4$ is hydrogen, methyl or, especially, phenyl. Especially preferred compounds are those in which the $SO_3M$ group is in para position to the oxygen atom.

With respect to the compounds of formula (4), preferred compounds are those in which $R_1$ is hydrogen , more especially those in which each $SO_3M$ group is in para position to the respective oxygen atom.

As to the compounds of formula (5), (6), (7) and (8), preferably R, is hydrogen or methyl, q is 1, $R_5$ is hydrogen, methyl or $SO_3Na$ and is preferably in p-position with respect to the oxygen atom, Y is —$CH_2CH_2$- or cyclohexylene and A is a chloride, chlorate, acetate, hydroxy, methoxy or $PF_6$ anion.

In relation to the compounds of formula (9), preferably $R_6$ and $R_7$ are the same. The preferred anion, when present, is acetate.

With respect to the compounds of formula (11) or (12), preferably $R_1$ is hydrogen , n is 0 and A is acetate.

In relation to the compounds of formula (13), preferably $R_1$ is hydrogen, m is 2 or 3 and A is acetate.

With respect to the compounds of formula (14), preferred compounds are those in which $R_1$ is hydrogen, m is 2 and A is Cl.

With respect to the compounds of formula (15), preferred compounds are those in which m is 2 and A is chloride.

As to the compounds of formula (16), preferably m is 2 and A is acetate.

In the compounds of formula (17), A is preferably perchlorate.

In each of the compounds of formula (1) to (18), it is preferred that they are used in neutral form, i.e. that M, when present, is other than hydrogen, preferably a cation formed from an alkali metal, in particular sodium, or from an amine.

Moreover, in each of the compounds of formula (1) to (4), (9), (10), (11), (12), (13), (14) and (18), the respective benzene rings may contain, in addition to any sulpho group, one or more further substituents such as $C_1$–$C_4$-alkyl, $C_1$–$C_4$-alkoxy, halogen, cyano or nitro.

The manganese complexes of formula (5) in which q is 2, 3 or 4 and those of formula (6), (7), (8) and (11) to (17) are believed to be new compounds and, as such, form a further aspect of the present invention. The compounds of formula (5) are described, at least in part in WO 93/03838. The compounds of formula (5), (6) and (10) to (18) may be produced by known methods, e.g. by the methods analogous to those disclosed in U.S. Pat. No. 4,655,785 relating to similar copper complexes. The compounds of formula (7) and (8) may be produced by oxidative coupling of the respective compound of formula (5) or (6).

The peroxy component a) of the fabric bleaching compositions of the present invention may be hydrogen peroxide, a compound which liberates hydrogen peroxide, a peroxyacid, a peroxyacid bleach precursor or a mixture thereof.

Compounds which liberate hydrogen peroxide are well known and include, e.g., inorganic compounds such as alkali metal peroxides, -perborates, -percarbonates, -perphosphates and -persulfates and organic compounds such as peroxylauric acid, peroxybenzoic acid, 1,12-diperoxydodecanoic acid, diperoxyisophthalic acid and urea peroxide, as well as mixtures thereof. Sodium percarbonate and sodium perborate, in particular sodium perborate monohydrate, are preferred.

Peroxyacid compounds and peroxyacid bleach precursors are also well known and a summary of references describing them is provided in the above-mentioned U.S. Pat. No. 5 114606.

Examples of peroxyacid bleach precursors include benz (4H)-1,3-oxazin-4-one derivatives, especially substituted 2-phenyl-benz(4H)- 1,3-oxazin-4-one 2-(N,N,N-trimethyl ammonium) ethyl sodium-4-sulfophenyl carbonate chloride (SPCC) N-octyl,N,N-dimethyl-N10-carbophenoxy decyl ammonium chloride (ODC) 3-(N,N,N-trimethyl ammonium) propyl sodium 4-sulfophenyl carboxylate N,N,N-trimethyl ammonium toluyloxy benzene sulfonate sodium-4-benzoyloxy benzene sulfonate (SBOBS) N,N,N',N'-tetraacetyl ethylene diamine (TAED) sodium-1-methyl-2-benzoyloxy benzene-4-sulfonate sodium-4-methyl-3-benzoyloxy benzoate and sodium nonanoyloxybenzene sulfonate (NOBS). The substituted 2-phenyl-benz(4H)-1,3-oxazin-4-one, NOBS and TAED precursors are preferred Preferably, the amount of the peroxy compound in the fabric bleaching composition according to the invention ranges from 0.5 to 50%, especially from 2 to 20% by weight, based on the total weight of the composition.

The fabric bleaching compositions of the present invention preferably also comprises a surfactant and a detergent builder component.

The surfactant component is preferably an anionic surfactant, a nonionic surfactant or a mixture thereof and is preferably present in an amount of 5 to 50%, especially 5 to 25% by weight, based on the total weight of the fabric bleaching composition.

The anionic surfactant component may be, e.g., a sulphate, sulphonate or carboxylate surfactant, or a mixture of these.

Preferred sulphates are alkyl sulphates having 12–22 carbon atoms in the alkyl radical, optionally in combination with alkyl ethoxy sulphates having 10–20 carbon atoms in the alkyl radical.

Preferred sulphonates include alkyl benzene sulphonates having 9–15 carbon atoms in the alkyl radical.

In each case, the cation is preferably an alkali metal, especially sodium.

Preferred carboxylates are alkali metal sarcosinates of formula $R—CO(R^1)CH_2COOM^1$ in which R is alkyl or alkenyl having 9–17 carbon atoms in the alkyl or alkenyl radical, $R^1$ is $C_1$–$C_4$ alkyl and $M^1$ is alkali metal.

The nonionic surfactant component may be, e.g., a condensate of ethylene oxide with a $C_9$–$C_{15}$ primary alcohol having 3–8 moles of ethylene oxide per mole.

The detergent builder component is preferably present in an amount of 5 to 80%, especially 10 to 60% by weight, based on the total weight of the fabric bleaching composition. It may be an alkali metal phosphate, especially a tripolyphosphate; a carbonate or bicarbonate, especially the sodium salts thereof; a silicate; an aluminosilicate; a polycarboxylate; a polycarboxylic acid; an organic phosphonate; or an aminoalkylene poly (alkylene phosphonate); or a mixture of these.

Preferred silicates are crystalline layered sodium silicates of the formula $$NaHSi_mO_{2m+1}.pH_2O \text{ or } Na_2Si_mO_{2m+1}.pH_2O$$

in which m is a number from 1.9 to 4 and p is 0 to 20.

Preferred aluminosilicates are the commercially-available synthetic materials designated as Zeolites A, B, X, and HS, or mixtures of these. Zeolite A is preferred.

Preferred polycarboxylates include hydroxypolycarboxylates, in particular citrates, polyacrylates and their copolymers with maleic anhydride.

Preferred polycarboxylic acids include nitrilotriacetic acid and ethylene diamine tetra-acetic acid.

Preferred organic phosphonates or aminoalkylene poly (alkylene phosphonates) are alkali metal ethane 1-hydroxy diphosphonates, nitrilo trimethylene phosphonates, ethylene diamine tetra methylene phosphonates and diethylene triamine penta methylene phosphonates.

The fabric bleaching compositions of the invention may contain, in addition to the components already mentioned, one or more of fluorescent whitening agents, such as a bis-triazinylamino-stilbene-disulphonic acid, a bis-triazolyl-stilbene-disulphonic acid, a bis-styryl-biphenyl, a bis-benzofuranylbiphenyl, a bis-benzoxalyl derivative, a bis-benzimidazolyl derivative, a coumarine derivative or a pyrazoline derivative; soil suspending agents, for example sodium carboxymethylcellulose; salts for adjusting the pH, for example alkali or alkaline earth metal silicates; foam regulators, for example soap; salts for adjusting the spray drying and granulating properties, for example sodium sulphate; perfumes; and also, if appropriate, antistatic and softening agents; such as smectite clays; enzymes, such as proteases, cellulases, lipases, oxidases and amylases; photobleaching agents; pigments; and/or shading agents. These constituents should, of course, be stable to the bleaching system employed.

A particularly preferred fabric bleaching composition co-additive is a polymer known to be useful in preventing the transfer of labile dyes between fabrics during the washing cycle. Preferred examples of such polymers are polyvinyl pyrrolidones, optionally modified by the inclusion of an anionic or cationic substituent, especially those having a molecular weight in the range from 5000 to 60,000, in particular from 10,00 to 50,000. Preferably, such polymer is used in an amount ranging from 0.05 to 5%, preferably 0.2–1.7% by weight, based on the weight of the detergent.

The formulation of the fabric bleaching compositions of the invention may be conducted by any conventional technique.

The fabric bleaching composition may be formulated as a solid; or as a non-aqueous liquid fabric bleaching composition, containing not more than 5, preferably 0–1 wt. % of water, and based on a suspension of a builder in a non-ionic surfactant, as described, e.g., in GB-A-2158454.

Preferably, the fabric bleaching composition is in powder or granulate form.

Such powder or granulate forms may be produced by firstly forming a base powder by spray-drying an aqueous slurry containing all the said components, apart from the components a) and b); then adding the components a) and b) by dry-blending them into the base powder. In a further process, the component b) may be added to an aqueous slurry containing the surfactant and builder components, followed by spray-drying the slurry prior to dry-blending component a) into the mixture. In a still further process, a nonionic component is not present, or is only partly present in an aqueous slurry containing anionic surfactant and builder components; component b) is incorporated into the nonionic surfactant component, which is then added to the spray-dried base powder; and finally component a) is dry-blended into the mixture.

The present invention also comprises a bleaching and/or cleaning process comprising contacting a fabric to be bleached and/or cleaned with an effective amount of a fabric bleaching composition according to the present invention. Preferably the amount of the fabric bleaching composition used is such that the amount of manganese complex b) provides from 0.001 to 100 ppm, preferably from 0.01 to 20 ppm of manganese in the bleaching and/or cleaning bath.

The following Examples serve to illustrate the invention; parts and percentages are by weight, unless otherwise stated.

EXAMPLE 1

6 g of ethylenediamine are dropped into a solution of 34.5 g of 3-isopropylsalicylaldehyde in 500 ml of ethanol over 1 hour at 60° C. Stirring is continued at 60° C. for a further 2 hours and the precipitate so formed is filtered off. There are obtained 34.5 g of a yellow liquid compound having the formula:

(101)

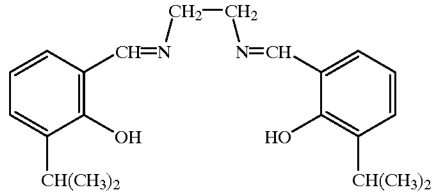

corresponding to a yield of 98% of theory.

To 10.6 g of the compound of formula (101) dissolved in 350 ml of ethanol there are added 7.4 g of manganese-(II)-acetate.$4H_2O$. The dark brown solution so produced is stirred at 65° C. for 3 hours and then evaporated to dryness. There are obtained 10.5 g of the compound having the formula:

(102)

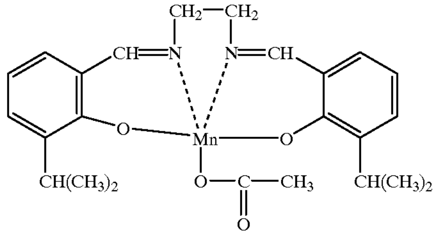

corresponding to a yield of 75% of theory.

Elemental analysis of the compound having the formula (102) and having the empirical formula $C_{24}H_{29}MnN_2O_4$. 0.8 3-isopropylsalicylaldehyde gives:

Req. % C 64.47; H 6.48; N 4.70; Mn 9.23.

Found % C 64.5; H 6.7; N 5.0; Mn 9.46.

EXAMPLE 2

Using the procedure described in Example 1 but with appropriate modification of the salicylaldehyde starting material, the compound of formula:

(103)

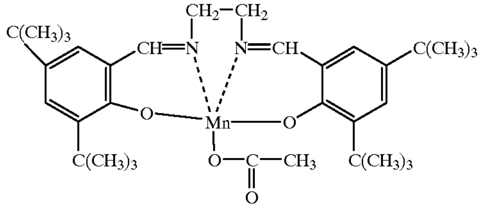

is obtained as a dark brown product in a yield of 91% of theory.

Elemental analysis of the compound having the formula (103) and having the empirical formula $C_{34}H_{49}MnN_2O_4$. 1.0 acetic acid gives:

Req. % C 65.05; H 7.97; N 4.21; Mn 8.27.

Found % C 64.3; H 8.1; N 4.2; Mn 8.44.

EXAMPLE 3

Using the procedure described in Example 1 but with appropriate modification of the salicylaldehyde starting material and the salt formation step, the compound of formula:

(104)

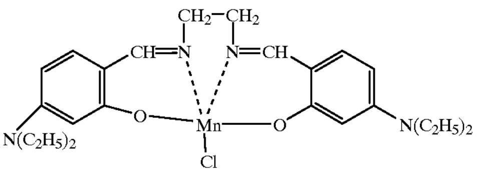

is obtained as a red brown product in a yield of 63% of theory.

Elemental analysis of the compound having the formula (104) and having the empirical formula $C_{24}H_{32}ClMnN_4O_2$. 0.75 $H_2O$ gives:

Req. % C 56.41; H 6.55; N 10.96; Cl 6.94; Mn 10.76.

Found % C 56.5; H 6.6; N 10.9; Cl 6.8; Mn 9.9.

EXAMPLE 4

Using the procedure described in Example 1 but with appropriate modification of the salicylaldehyde starting material, the compound of formula:

(105)

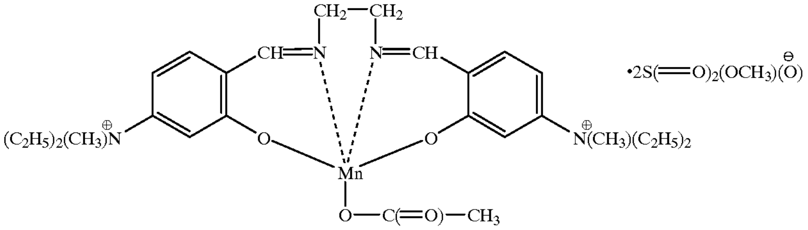

is obtained as a red product in a yield of 61% of theory.

Elemental analysis of the compound having the formula (105) and having the empirical formula $C_{30}H_{47}MnN_4O_{12}S_2$. 2.5 $H_2O$ gives:

Req. % C 43.90; H 6.34; N 6.83; S 7.80; Mn 6.70.

Found % C 44.20; H 6.7; N 6.6; S 7.1; Mn 5.71.

EXAMPLE 5

60 g of ethylenediamine are dropped into a solution of 277 g of salicylaldehyde in 500 ml of ethanol over 1 hour at 60° C. Stirring is continued at 60° C. for a further 2 hours and the precipitate so formed is filtered off. There are obtained 260 g of a yellow compound having the formula:

(106)

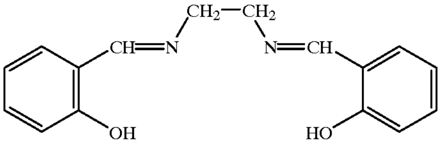

corresponding to a yield of 97% of theory.

16 g. of this compound are dissolved in 500 mls. of ethanol and treated with 11.9 g. of manganese-II-chloride.4$H_2O$ and with 11.9 g. of potassium hexafluorophosphate. The solution is stirred for 20 minutes at 25° C., then cooled to 5° C. and treated with a mixture of 12 mls. of 30% caustic soda solution, 6.8 mls. of a 30% hydrogen peroxide solution and 300 mls. of water. The pH of the solution is adjusted to 8–9 using 2N $H_2SO_4$ and filtered. After concentration of the filtrate, 8 g. of a brown-violet crystalline product of formula (107) are obtained, corresponding to a yield of 32% of theory:

(107)

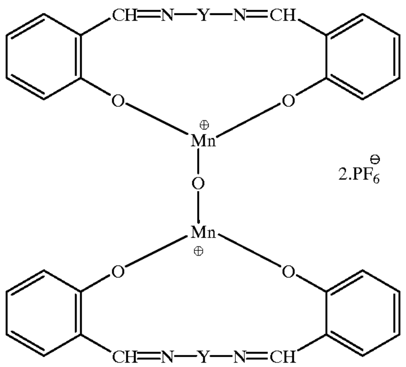

Elemental analysis of the compound having the formula (107) and having the empirical formula $C_{32}H_{28}F_{12}Mn_2N_4O_5P_2$ gives:

Req. % C 40.53; H 2.99; N 5.91; F 24.04; Mn 11.59.

Found % C 40.8; H 3.3; N 6.0; F 22.3; Mn 11.1.

EXAMPLE 6

The compound of formula (106) described in Example 5 is dissolved in tetrahydrofuran solvent and hydrogenated at 25° C. and under normal pressure in the presence of a 5% Pd/C catalyst. The compound of the following formula is obtained in 86% of the theoretical yield:

(108)

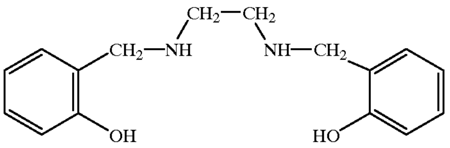

Using the procedure described in Example 1, the compound (108) is converted into the dark brown compound having the following formula in a yield of 12% of the theoretical yield:

(109)

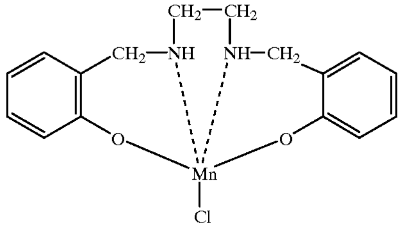

Elemental analysis of the compound having the formula (109) and having the empirical formula $C_{16}H_{18}ClMnN_2O_2.1.5\ H_2O$. 0.33 compound (108) gives:

Req. % C 53.53; H 5.16; N 7.81; Cl 7.43; Mn 11.53.

Found % C 53.1; H 5.6; N 7.4; Cl 7.8; Mn 11.7.

EXAMPLE 7

Using the procedure described in Example 1, the following compound of formula (110) is obtained:

(110)

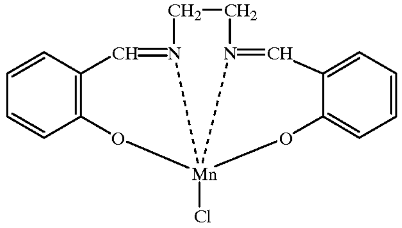

Elemental analysis of the compound having the formula (110) and having the empirical formula $C_{16}H_{14}ClMnN_2O_2$. 1.92 $H_2O$ gives:

Req. % C 49.11; H 4.60; N 7.16; Cl 9.06; Mn 14.04.

Found % C 49.4; H 4.6; N 7.1; Cl 8.9; Mn 13.9.

EXAMPLE 8

To 26.8 g of the compound of formula (106), as described in Example 5, dissolved in 450 ml of water there are added 24.5 g of manganese-(II)-acetate.$4H_2O$ and 26.2 g of 30% caustic soda solution. The dark brown solution so produced is stirred at 70° C. for 2 hours and then cooled to 5° C. The precipitated dark brown product is filtered off and dried in vacuum. There are obtained 25 g of the compound having the formula (111) (92% of theory):

(111)

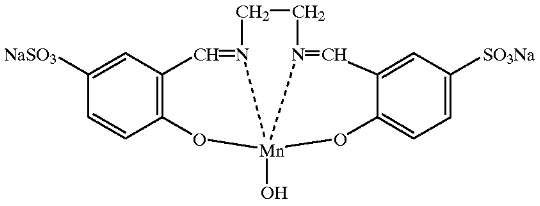

Elemental analysis of the compound having the formula (111) and having the empirical formula $C_{16}H_{13}MnN_2Na_2O_9S_2$. $1.0H_2O$ gives:

Req. % C 34.2; H 3.03; N 5.0; Mn 9.8.

Found % C 34.2; H 3.3; N 5.6; Mn 9.3.

EXAMPLE 9

Using the procedure described in Example 1, the following compound of formula (112) is prepared:

(112)

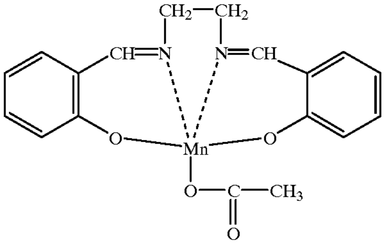

Elemental analysis of the compound having the formula (112) and having the empirical formula $C_{18}H_{17}MnN_2O_4$ gives:

Req. % C 56.8; H 4.5; N 7.4; Mn 14.5.

Found % C 56.7; H 4.6; N 7.3; Mn 14.6.

EXAMPLE 10

Using the procedure described in Example 1, the following compound of formula (113) is prepared:

(113)

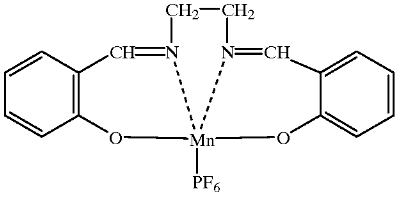

Elemental analysis of the compound having the formula (113) and having the empirical formula $C_{16}H_{14}F_6MnN_2O_2P$. $2.12H_2O$ gives:

Req. % C 38.1; H 3.6; N 5.6; $H_2O$ 7.6; Mn 10.9.

Found % C 38.5; H 3.5; N 5.7; $H_2O$ 7.6; Mn 11.0.

EXAMPLE 11

Using the procedure described in Example 1, the following compound of formula (114) is prepared:

(114)

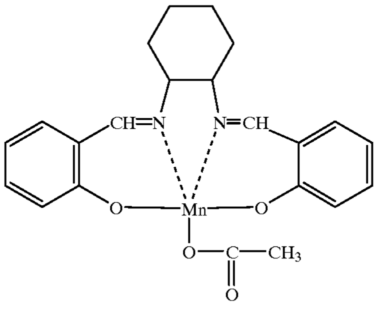

Elemental analysis of the compound having the formula (114) and having the empirical formula $C_{22}H_{23}MnN_2O_4.1.9H_2O$ gives:

Req. % C 56.4; H 5.8; N 6.0; $H_2O$ 7.3; Mn 11.7.

Found % C 56.2; H 5.8; N 5.9; $H_2O$ 7.3; Mn 11.5.

EXAMPLE 12

Using the procedure described in Example 1, the following compound of formula (115) is prepared:

(115)

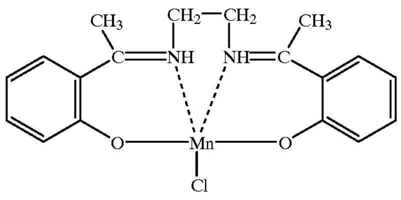

Elemental analysis of the compound having the formula (115) having the empirical formula $C_{18}H_{18}ClMnN_2O_4$ gives:

Req. % C 56.2; H 4.7; N 7.3; Mn 17.3.

Found % C 56.3; H 4.6; N 7.1; Mn 17.1.

EXAMPLE 13

Using the procedure described in Example 1, the following compound of formula (116) is prepared:

(116)

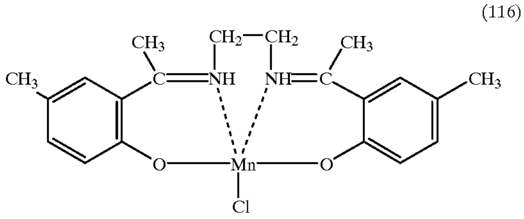

Elemental analysis of the compound having the formula (116) having the empirical formula $C_{20}H_{22}ClMnN_2O_2.4.25\ H_2O.0.33\ NaCl$ gives:

Req. % C 49.1; H 5.8; N 5.72; Cl 9.65; Mn 11.23.

Found % C 49.1; H 5.9; N 5.6; Cl 9.8; Mn 10.8.

EXAMPLE 14

Using the procedure described in Example 1, the following compound of formula (117) is prepared:

(117)

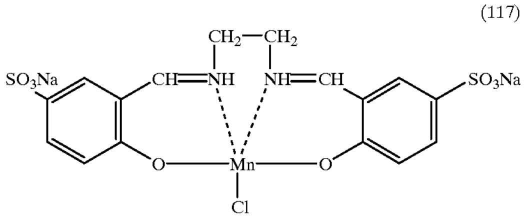

Elemental analysis of the compound having the formula (117) having the empirical formula $C_{16}H_{12}ClMnN_2Na_2O_8S_2$. $3H_2O$. 1.2NaCl gives:

Req. % C 28.0; H 2.6; N 4.1; Mn 8.0; S 9.3.

Found % C28.0;H2.6;N4.1;Mn7.8;S9.1.

EXAMPLE 15

Using the procedure described in Example 1, the following compound of formula (118) is prepared:

(118)

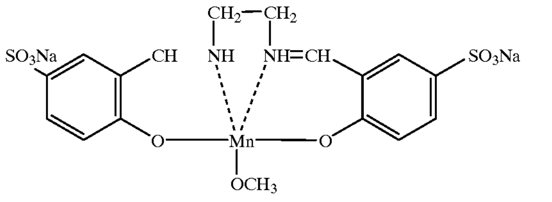

Elemental analysis of the compound having the formula (118) and having the empirical formula $C_{17}H_{15}MnN_2Na_2O_9S_2$ gives:

Req. % C 34.0; H 2.7; N 5.0; Mn 9.9; S 11.5.

Found % C 34.8; H 3.3; N 5.0; Mn 10.1; S 11.2.

EXAMPLE 16

Using the procedure described in Example 1, the following compound of formula (119) is prepared:

(119)

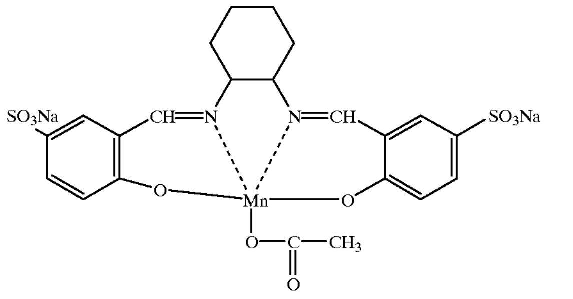

Elemental analysis of the compound having the formula (119) and having the empirical formula $C_{22}H_{21}MnN_2Na_2O_{10}S_2$. $1.56H_2O$ gives:

Req. % C 39.6; H 3.6; N 4.2; Mn 8.2; S 9.6.

Found % C 39.6; H 4.2; N 4.9; Mn 8.7; S 9.6.

EXAMPLE 17

Using the procedure described in Example 1, the following compound of formula (120) is prepared:

(120)

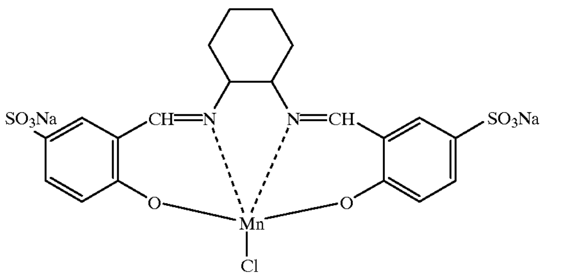

Elemental analysis of the compound having the formula (120) having the empirical formula $C_{20}H_{18}ClMnN_2Na_2O_8S_2$. $2.5H_2O$. 1.45NaCl gives:

Req. % C 32.2; H 3.1; N 3.8; Mn 7.4.

Found % C 32.2; H 3.1; N 3.8; Mn 7.2.

EXAMPLE 18

(121)

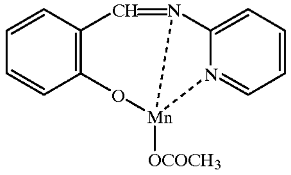

A) To a solution of 18.8 g. of 2-aminopyridine in 300 ml. of ethanol, there are added 24.4 g. of salicylaldehyde. The mixture is heated to 70–75° C. and stirred for 7 hours. The mixture is concentrated to one third of its volume and then cooled to 5° C., whereupon an orange product having the formula:

(121a)

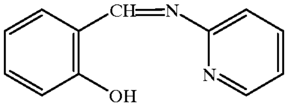

crystallised out. The product is filtered off with suction and allowed to dry in the air, giving a yield of 25.5 g. (65% of theory).

Elemental analysis of the compound having the formula (121a) having the empirical formula $C_{12}H_{10}N_2O$ gives:

Req. % C 72.71; H 5.08; N 14.13.

Found % C 72.6; H 5.1; N 14.1.

B) To a solution of 5.9 g. of the compound of formula (121a) obtained in Part A), in 200 ml. of ethanol, there are added 8.5 g. of manganese-III-acetate dihydrate. The resulting dark brown solution is stirred for 5 hours at 60–65° C. and evaporated to dryness. The residue is dried in vacuum giving a yield of 6.3 g. (68% of theory) of a light brown compound having the formula (121).

Elemental analysis of the compound having the formula (121) having the empirrical formula $C_{14}H_{12}MnN_2O_3.CH_3COOH$ gives:

Req. % C 49.48; H 4.38; N 7.22; Mn 14.17.

Found % C 50.18; H 4.45; N 7.40; Mn 14.4.

EXAMPLE 19

(122)

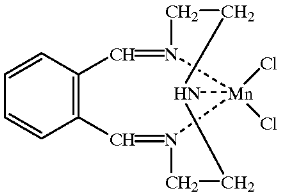

A) To a solution of 26.8 g. phthaldialdehyde in 1000 ml. of ethanol there are added 21.5 ml. of diethylenetriamine and the mixture is stirred for 20 hours at 25° C. The resulting solution becomes brown-green in colour and is evaporated to dryness giving 40 g. (100% theory) of a thick brown liquid having the formula:

(122a)

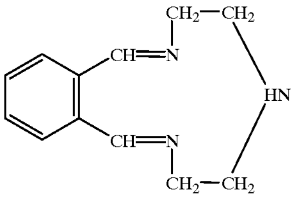

B) To a solution of 19.8 g. of manganese-II-chloride tetrahydrate in 250 ml. of ethanol, there is added a solution of 20.1 g. of the product of formula (122a) in 250 ml. of ethanol. An ochre yellow suspension is formed and this is stirred for 18 hours at 25° C. The product is filtered off with suction, washed with ethanol and dried in vacuum at 25° C. giving 28 g. (85% theory) of an ochre yellow of formula (122).

Elemental analysis of the compound having the formula (122) and having the empirical formula $C_{12}H_{14}Cl_2MnN_3$ gives:

Req. % C 37.81; H 5.55; N 11.02; Cl 18.60; Mn 14.41.

Found % C 38.0; H 5.0; N 10.5; Cl 19; Mn 15.4.

EXAMPLE 20

(123)

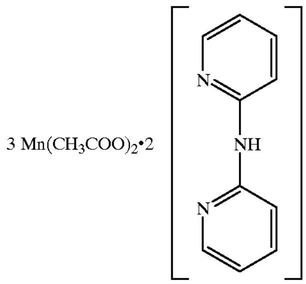

To a solution of 5.1 g. of 2,2'-dipyridylamine in 50 ml. of ethanol there are added 7.4 g. of manganese-II-acetate tetrahydrate and the mixture is stirred for 18 hours at 25° C. The product is filtered off with suction, washed with methanol and dried in vacuum at 25° C. giving 6.6 g. (58% theory) of a white product having the formula (123).

Elemental analysis of the compound having the formula (123) having the empirical formula $C_{32}H_{36}Mn_3N_6O_{12}$ gives:

Req. % C 44.62; H 4.21; N 9.76; Mn 19.13.

Found % C 44.70; H 4.15; N 9.72; Mn 19.8.

EXAMPLE 21

(124)

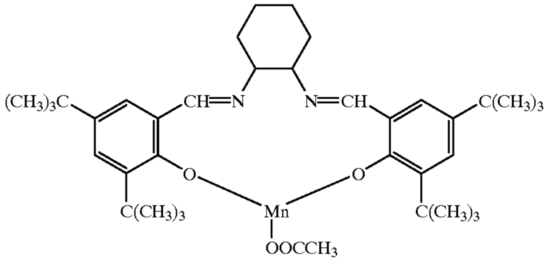

8.2 g. of 1,2-bis(3,5-di-tert.butylsalicylidamino) cyclohexane are added to 400 ml. of ethanol, the mixture is heated to 65° C. and 3.7 g. of manganese-II-acetate tetrahydrate are added to the yellow suspension. After a short time, a dark brown solution is formed which is stirred for 15 hours and then evaporated to dryness. 9.5 g. (92.8% theory) of a dark brown powder having the formula (124) are obtained.

Elemental analysis of the compound having the formula (124) having the empirical formula $C_{38}H_{55}MnN_2O_4$. 1.33 $H_2O$ gives:

Req. % C 66.85; H 8.43; N 4.10; Mn 8.05.

Found % C 66.98; H 8.53; N 4.00; Mn 7.82.

EXAMPLE 22

(125)

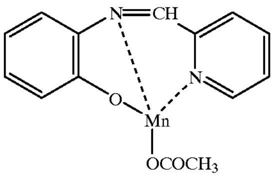

10.9 g. of o-aminophenol and 10.7 g. of pyridine-2-aldehyde are stirred in 200 ml. of ethanol for 5 hours at 60–65° C. The solution is then treated with 24.5 g. of manganese-II-acetate tetrahydrate and stirred for 5 hours at 60–65° C. The solution is evaporated and the residue is dried in vacuum giving 31 g. (95% theory) of a red-brown product having the formula (125).

Elemental analysis of the compound having the formula (125) and having the empirical formula $C_{14}H_{12}MnN_2O_3$. 0.83 $H_2O$ gives:

Req. % C 51.58; H 4.22; N 8.59; Mn 16.87.

Found% C51.76;H3.91;N8.11;Mn 16.80.

EXAMPLE 23

(126)

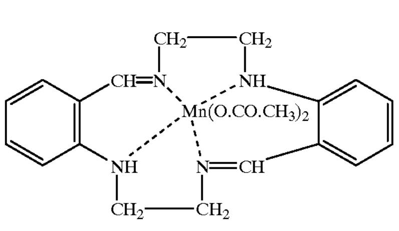

A) To a solution of 405 ml. of diaminoethane in 1000 ml. of toluene there are added 20 ml. of formic acid and 63.4 g. of copper dust. The suspension is heated to 100° C. and is treated, dropwise, over 2 hours, with a solution of 111 ml. of o-chlorobenzaldehyde in 115 ml. of toluene. After 4 hours at 100° C., the mixture is cooled to 75° C. and some copper dust is filtered off.

The filtrate forms two phases. The upper toluene phase is separated and concentrated to 100 ml. This concentrate is diluted with 200 ml. of ethanol and allowed to stand for 48 hours at 25° C. The product which crystallises out is filtered with suction and dried in vacuum at 40° C. giving 24 g. (16% theory) of a yellow product having the formula:

(126a)

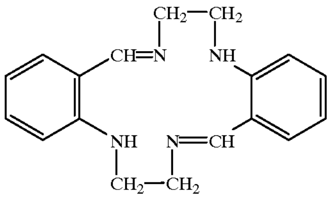

B) 5.8 g. of the compound of formula (126a) obtained in Part A) and 5 g. of manganese-II-acetate tetrahydrate are stirred for 12 hours in 200 ml. of ethanol, filtered with suction, washed with ethanol and dried in vacuum, giving 7.5 g. of the compound of formula (126).

Elemental analysis of the compound having the formula (126) having the empirical formula $C_{22}H_{26}MnN_4O_4$. 0.14 $MnO_2$ gives:

Req. % C 55.30; H 5.48; N 11.72; Mn 13.12.

Found % C 55.34; H 5.55; N 11.80; Mn 12.70.

EXAMPLE 24

(127)

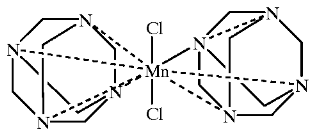

To a solution of 19.8 g. of manganese-II-chlorride in 200 ml. of methanol there are added 14 g. of hexamethylenetetrmrlne. After siring at 25° C. for 20 hours, the precipitated product is filtered with suction and dried in vacuum at 25° C., giving 18.5 g. (91% theory) of a light grey product having the formula (127).

Elemental analysis of the compound having the formula (127) and having the empirical formula $C_{12}H_{24}Cl_2MnN_8$ 2 $H_2O$ gives:

Req. % C 32.59; H 6.38; N 25.34; Cl 16.03; Mn 12.42.

Found % C 32.2; H 6.5; N 24.8; Cl 16.2; Mn 12.4.

EXAMPLE 25

(128)

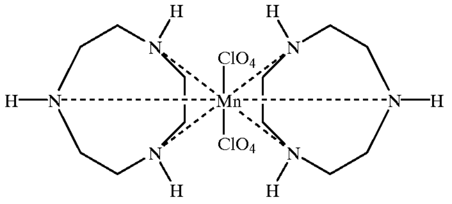

To a solution of 3 g. of triazacyclononane in 80 ml. of methanol there are added 2 g. of manganese perchlorate hexahydrate. A white suspension is formed immediately. After 30 minutes, 1 g. of sodium acetate is added and the mixture is sted for 24 hours at 25° C. The product is filtered with suction, washed with methanol and dried in vacuum at 25° C., giving 1.8 g. (65% theory) of a white product having the formula (128).

Elemental analysis of the compound having the formula (128) and having the empirical formula $C_{12}H_{30}Cl_2MnN_6O_8$ gives:

Req. % C 28.12; H 5.86; N 16.41; Cl 13.87; Mn 10.74.

Found % C 28.1; H 6.2; N 16.3; Cl 13.6; Mn 11.0.

EXAMPLE 26

(129)

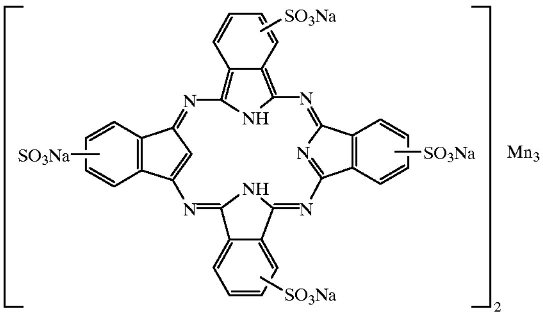

To a solution of 13.8 g. of phthalocyanine tetrasulphonic acid in 140 ml. of water there are added 4.2 g. of manganese-III-acetate dihydrate. The mixture is heated to 70–75° C. and stirred for 12 hours. 20 g. of sodium chloride are added, the mixture is stirred for a further 6 hours, cooled to 5° C. and filtered with suction. The material filtered off is dissolved in 200 ml. of water and dialysed for 40 hours. The solution remaining is evaporated to dryness and the residue is dried in vacuum, giving 3.5 g. (20% theory) of a black product having the formula (129).

Elemental analysis of the compound having the formula (129) having the empirical formula $C_{64}H_{40}Mn_3N_{16}O_{24}S_8 \cdot 2.2\ H_2O$ gives:

Req. % C 31.78; H 3.50; N 9.27; S 10.61; Mn 6.81.

Found % C 32.1; H 3.2; N 9.4; S 10.7; Mn 6.79.

EXAMPLE 27

A standard (ECE) washing powder is made up from the following components in the indicated proportions:

8.0% Sodium ($C_{11.5}$)alkylbenzenesulphonate;

2.9% Tallow-alcohol-tetradecane-ethyleneglycolether (14 moles EO);

3.5% Sodium soap;

43.8% Sodium triphosphate;

7.5% Sodium silicate;

1.9% Magnesium silicate;

1.2% Carboxymethylcellulose;

0.2% EDTA;

21.2% Sodium sulphate; and 9.8% Water.

An aqueous wash liquid is then made up and contains 7.5 g/l of the ECE powder, 1.13 g/l of sodium perborate monohydrate and 0.015 g/l of the compound of formula (111) as described in Example 8.

Into 400 ml of the aqueous wash liquid (made up using town water of 12 degrees of hardness), there are placed 12.5 g. of test cotton fabric soiled with red wine, tea, coffee or blackberry stains, as well 37.5 g. of bleached cotton (i.e. giving a liquor ratio of 1:8).

The respective wash baths are each heated from 15° C. to the test temperature of 25° C., 40° C. or 60° C. over a period of 10 minutes; and held at the respective test temperature for a further 10 minutes. The respective swatches are then rinsed under flowing, cold town water, spun dry and ironed.

The brightness value (Y) of the respective test swatches is then determined using an ICS SF 500 spectrophotometer. The value Y provides a measure of the level of bleach effect achieved. A difference of 1 Y unit is clearly detectable visually.

For reference purposes, the respective Y values are determined for each of the washed goods at 25° C. using perborate alone (i.e. using no compound of formula 109).

The results obtained are set out in the following Table.

TABLE

| | ΔY | | | | | |
|---|---|---|---|---|---|---|
| | 15% perborate | | | 15% perborate + 0.2% cpd. 110 | | |
| Soil Type | 25° C. | 40° C. | 60° C. | 25° C. | 40° C. | 60° C. |
| red wine | Y = 64 | +1 | +3 | +4 | +6 | +14 |
| tea | Y = 65 | 0 | +5 | +4 | +10 | +22 |
| coffee | Y = 72 | +1 | +5 | +4 | +6 | +14 |
| blackberry | Y = 60 | +2 | +7 | +7 | +10 | +23 |

It is clear from the results in the Table that, at any given temperature, the bleaching improvement achieved with a fabric bleaching composition according to the invention are 3 to 5 times greater than those achieved using perborate alone. Moreover, even at 25° C., a fabric bleaching composition according to the invention provides bleaching effects which are equivalent to those obtained at 60° C. using perborate alone.

Similar results are obtained when the compound of formula (111) is replaced by a compound of formula (110), (112), (114), (117), (118), (119), (120), (121), (122), (123), (124), (125), (126), (128) or (129).

We claim:

1. A fabric bleaching process comprising contacting a fabric to be bleached with an effective bleaching amount of a fabric bleaching composition comprising a) a peroxy compound; and b) 0.0005 to 0.5%, by weight of manganese, of one or more water-soluble manganese complexes having one of the formulae (5) through (8), (11) through (15), (17) or (18):

(5)

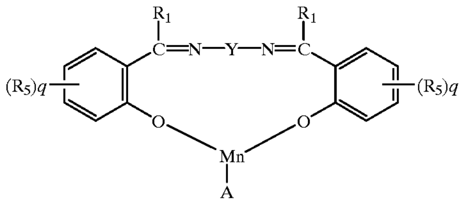

(6)

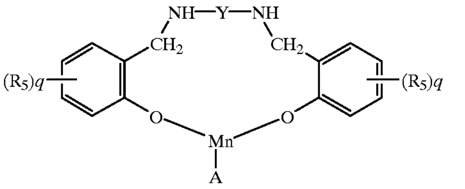

(7)

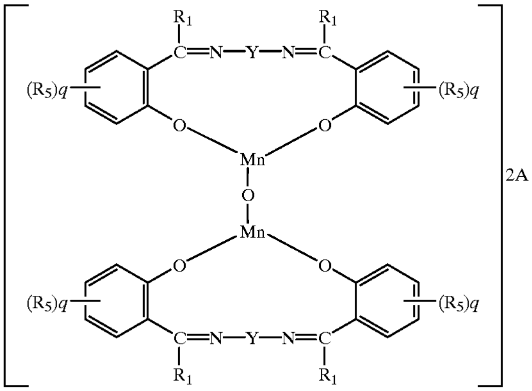

(8)

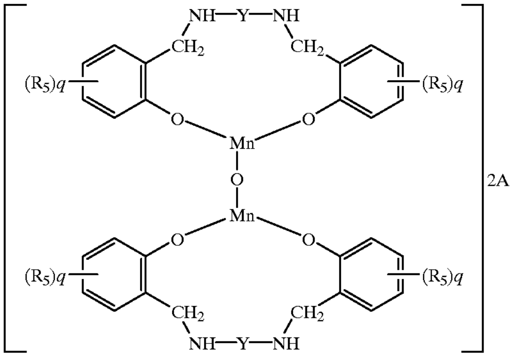

(11)

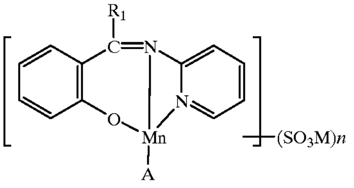

(12)

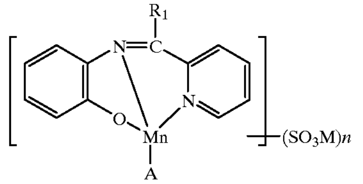

-continued (13)

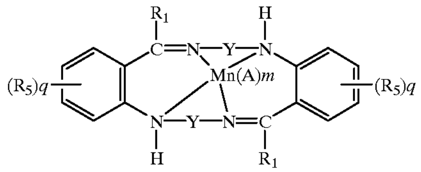

(14)

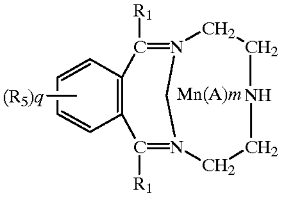

(15)

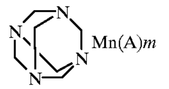

(17)

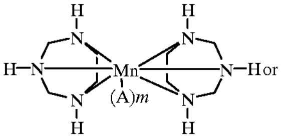

or (18)

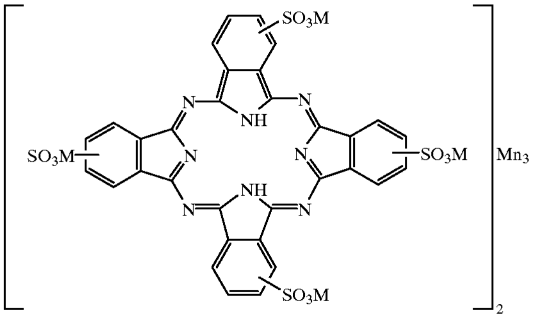

in which, in formulae (5),(6) through (8), (11) through (15), (17) or (18):

$R_1$ is hydrogen, alkyl, cycloalkyl, aryl, each of which is optionally substituted;

$R_5$ is hydrogen, alkyl, alkoxy, each of which is optionally substituted, halogen, cyano, $N(alkyl)_2$, $N^+(alkyl)_3$, wherein the alkyl groups are optionally substituted, or a water-solubilizing group;

Y is optionally substituted alkylene or cyclohexylene;

n is 0, 1, 2 or 3;

M is hydrogen, an alkali metal atom, ammonium or a cation formed from an amine;

m is 2 or 3;

q is 0, 1, 2or3; and

A is an anion, with the proviso that in the formula (5):

$R_5$ is optionally substituted alkoxy, halogen, cyano, N(optionally substituted alkyl)$_2$ or $N^+$(optionally substituted alkyl)$_3$; and $R_1$, q and A are as defined above.

2. A process according to claim 1 in which the amount of the fabric bleaching composition used is such that the amount of manganese complex b) provides from 0.001 to 100 ppm of manganese in the bleaching bath.

3. A process according to claim 2 in which the amount of the fabric bleaching composition used is such that the amount of manganese complex b) provides from 0.01 to 20 ppm of manganese in the bleaching bath.
4. A fabric bleaching composition comprising
a) a peroxy compound; and
b) 0.0005 to 0.5%, by weight of manganese, of one or more water-soluble manganese complexes having one of the formulae (5), (6), (7), (8), (11) to (15), (17) or (18):
(5)
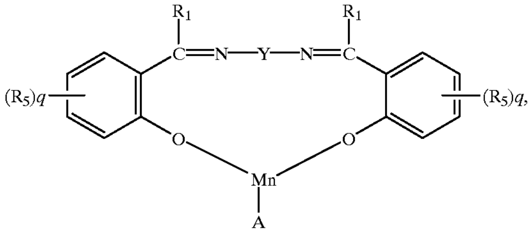
(6)
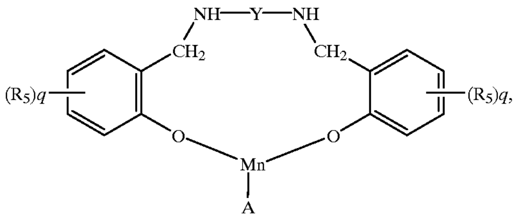
(7)
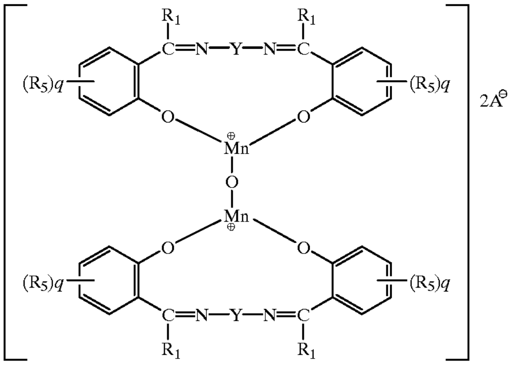
,
(8)
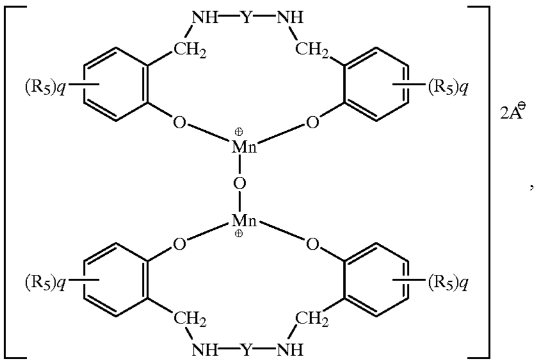
,
-continued
(11)
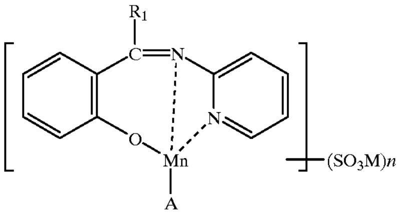
,
(12)
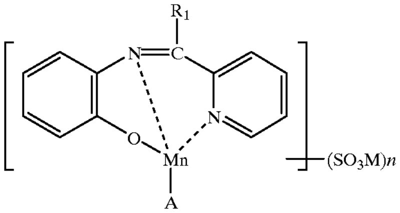
,
(13)
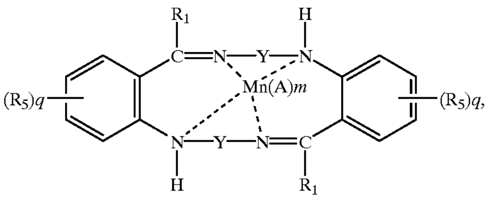
(14)
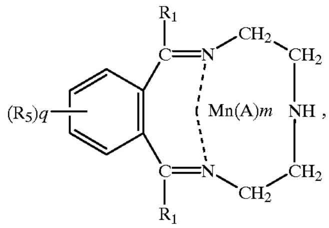
(15)
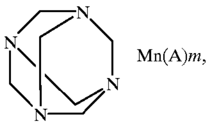
(17)
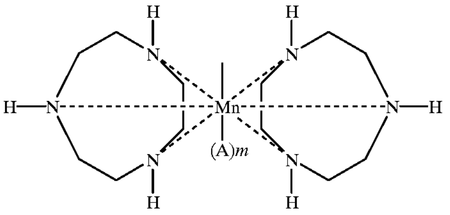
or -continued (18)

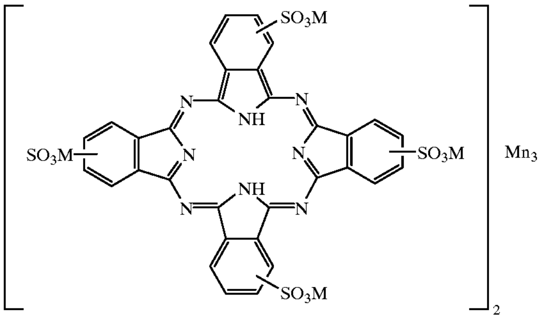

in which, in the formulae (5) (6), (7), (8), (11) to (15), (17) and (18), $R_1$ is hydrogen, alkyl, cycloalkyl or aryl, each of which is optionally substituted, $R_5$ is hydrogen, alkyl, alkoxy, each of which is optionally substituted, halogen, cyano, $N(alkyl)_2$, $N\oplus(alkyl)_3$, wherein the alkyl groups are optionally substituted, or a water-solubilising group, Y is optionally substituted alkylene or cyclohexylene, n is 0, 1, 2 or 3, M is hydrogen, an alkali metal atom, ammonium or a cation formed from an amine, m is 2 or 3, q is 0, 1, 2 or, and A is an anion, with the proviso that in the formula (5), $R_5$ is optionally substituted alkoxy, halogen, cyano, N(optionally substituted $alkyl)_2$ or $N\oplus$(optionally substituted $alkyl)_3$; and $R_1$, q and A are as defined above.

5. A composition according to claim 4 comprising a) a peroxy compound; and b) 0.005 to 0.05%, by weight of manganese, of one or more water-soluble manganese complexes having one of the formulae (5) to (8), (11) to (15), (17) or (18).

6. A composition according to claim 4 in which a water solubilising group $R_5$ is $SO_3M$ in which M is defined in claim 4.

7. A composition according to claim 4 in which a complex of formula (6), (7) or (8) is present in which $R_1$ is hydrogen or methyl, q is 1, $R_5$ is hydrogen, methyl or $SO_3Na$, Y is $—CH_2CH_2$- or cyclohexylene and A is a chloride, chlorate, acetate, hydroxy, methoxy or $PF_6$ anion.

8. A composition according to claim 7 in which each $SO_3Na$ group is in para position to the respective oxygen atom.

9. A composition according to claim 4 in which a compound of formula (11) or (12) is used in which $R_1$ is hydrogen, n is 0 and A is acetate.

10. A composition according to claim 4 in which a compound of formula (13) is used in which $R_1$ is hydrogen, m is 2 or 3 and A is acetate.

11. A composition according to claim 4 in which a compound of formula (14) is used in which $R_1$ is hydrogen, m is 2 and A is chloride.

12. A composition according to claim 4 in which a compound of formula (15) is used in which m is 2 and A is chloride.

13. A composition according to claim 4 in which a compound of formula (17) is used in which A is perchlorate.

14. A composition according to claim 4 in which the peroxy compound component a) is hydrogen peroxide, a compound which liberates hydrogen peroxide, or a peroxyacid.

15. A composition according to claim 14, in which the compound which liberates hydrogen peroxide is an alkali metal peroxide, -perborate, -percarbonate, -perphosphate or -persulfate; and the peroxryacid is peroxylauric acid, peroxybenzoic acid, diperoxyisophthalic acid, 1,12-diperoxydodecanedioic acid or urea peroxide.

16. A composition according to claim 15 in which the compound which liberates hydrogen peroxide is sodium percarbonate or sodium perborate.

17. A composition according to claim 4 in which the amount of the peroxy compound is 0.5 to 50% by weight, based on the total weight of the composition.

18. A composition according to claim 17 in which the amount of the peroxy compound is 2 to 20% by weight, based on the total weight of the composition.

19. A composition according to claim 4 in which a protease, cellulase, lipase, oxidase or amylase enzyme is present.

20. A composition according to claim 4 which is in liquid form and contains 0–5% water.

21. A composition according to claim 20 which is in liquid form and contains 0–1% water.

22. A composition according to claim 4 which is in powder or granulate form.

23. A process for the production of a composition as claimed in claim 22 in which a base powder is produced by spray-drying an aqueous slurry which contains all the components, apart from the components a) and b); then adding the components a) and b) by dry-blending them into the base powder.

24. A process for the production of a composition as claimed in claim 22 in which the component b) is added to an aqueous slurry containing the surfactant and builder components, followed by spray-drying the slurry prior to dry-blending component a) into the mixture.

25. A process for the production of a composition as claimed in claim 22 in which a nonionic surfactant component is not present, or is only partly present in an aqueous slurry containing anionic surfactant and builder components; component b) is incorporated into the nonionic surfactant component, which is then added to the spray-dried base powder; and finally component a) is dry-blended into the mixture.

26. A composition according to claim 4 which also comprises a surfactant and a detergent builder.

27. A composition according to claim 26 comprising 5–50% of an anionic surfactant and/or a nonionic surfactant.

28. A composition according to claim 27 comprising 5–25% of an anionic surfactant and/or a nonionic surfactant.

29. A composition according to claim 27 in which the anionic surfactant is a sulfate, sulfonate or carboxylate surfactant, or a mixture thereof.

30. A process for the production of a composition as claimed in claim 29 in which the components are mixed in dry form.

31. A composition according to claim 27 in which the nonionic surfactant is a condensate of ethylene oxide with a $C_9$–$C_{15}$ primarry alcohol having 3–8 moles of ethylene oxide per mole.

32. A composition according to claim 26 comprising 5–80% of a detergent builder.

33. A composition according to claim 32 comprising 10–60% of a detergent builder.

34. A composition according to claim 32 in which the detergent builder is an alkali metal phosphate, a carbonate, bicarbonate, a silicate, an aluminosilicate, a polycarboxylate, a polycarboxylic acid, an organic phosphonate, an aminoalkylene poly (alkylene phosphonate), or a mixture of these.

* * * * *